United States Patent

Dyer

[15] 3,678,298

[45] July 18, 1972

[54] TWO-STEP MAGNETIC DRIVER

[72] Inventor: George A. Dyer, San Juan Capistrano, Calif.

[73] Assignee: North American Rockwell Corporation

[22] Filed: April 28, 1971

[21] Appl. No.: 138,043

[52] U.S. Cl. ..............................307/270, 307/268, 307/314, 328/33, 328/156, 317/148.5

[51] Int. Cl. .......................................................H03k 5/12

[58] Field of Search .........................307/263, 268, 270, 314; 328/33, 65, 156, 157

[56] References Cited

UNITED STATES PATENTS 3,470,391 9/1969 Granger.................................307/270

2,537,589 1/1951 Johnson.............................328/156 X 3,411,045 11/1968 Reyner...............................307/270 X

*Primary Examiner*—Donald D. Forrer

*Assistant Examiner*—R. C. Woodbridge

*Attorney*—L. Lee Humphries, H. Fredrick Hamann and Rolf M. Pitts

[57] ABSTRACT

A drive circuit for pulse modulated excitation of an inductive load impedance and having both a fast turn-on/turn-off capability and minimum power consumption. A first transistorized power amplifier having a rapid turn-off response provides a sustaining excitation subsequent to the drive circuit delay transients, while a compensatory trigger circuit provides a compensatory output trigger wave form for compensating for the drive circuit turn-on delay transients.

4 Claims, 2 Drawing Figures

INVENTOR
GEORGE A. DYER
BY
ATTORNEY

INVENTOR
GEORGE A. DYER
BY Ralph M. Pitts
ATTORNEY

TWO-STEP MAGNETIC DRIVER

BACKGROUND OF THE INVENTION

In the pulse modulation or square wave control of an inductive load impedance for machine process control applications, such as electromagnetically actuated devices, precision control of such processes requires precise timing of the square wave form power used to provide controlled excitation. Rapid rise time and rapid decay time of the wave form are normally desired both to aid in precision timing of the control application and also to reduce the maximum power required to effect an average control energy expenditure. In other words, for a nearly perfect square wave form having rapid rise time and fall time, the average power supplied tends to equal the peak power requirement, as to minimize power requirements for a given machine process control application.

One prior art method of increasing the volts per second rise rate for a drive circuit for supplying power to an electromagnetically actuated device and having a given dynamic lag time is to over-excite the device; doubling the excitation doubles rise rate in volts per second, but results in an unnecessarily large expenditure of electrical energy.

SUMMARY OF THE INVENTION

By means of the concept of the subject invention, there is provided a drive circuit for d-c pulse modulation excitation of an inductive load impedance and having both a fast turn-on/turn-off capability and minimum power consumption.

In a preferred embodiment of the invention, there is provided a first transistorized power amplifier having a rapid turn-off response (provided by an output blocking diode) for providing a sustaining excitation subsequent to the drive circuit delay transients. There is further provided a compensatory trigger circuit having an output connected in parallel with that of the first circuit for providing a compensatory output trigger wave form which compensates for the drive circuit turn-on delay transients.

In normal operation of the above-described arrangement, a d-c pulse modulated power wave form of a preselected polarity is provided having rapid rise and fall times, in response to applied two-state control signals. Accordingly, it is an object of the invention to provide improved time-modulated power excitation means for an electromagnetically actuated control member.

It is another object to provide a drive circuit having both rapid rise time and fall time.

It is a further object to provide means for compensation of the turn-on delay transient of a drive circuit.

These and other objects of the invention will become apparent from the following description taken together with the accompanying drawings in which:

DESCRIPTION OF THE PREFERRED EMBODIMENT

Figure 1:
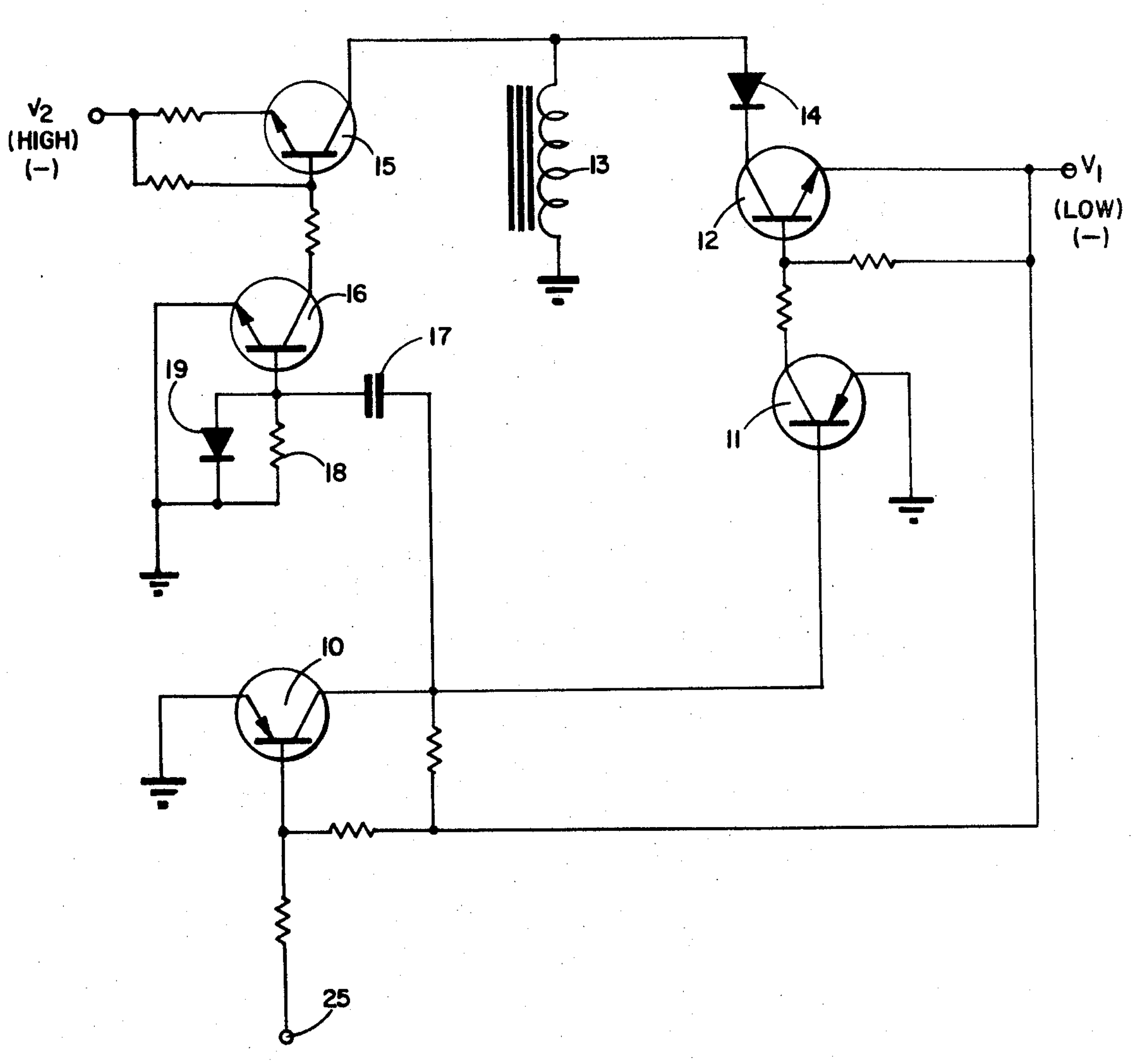
FIG. 1 is a schematic diagram of a circuit embodying the concept of the invention.

Referring now to FIG. 1, there is illustrated a schematic diagram of a circuit embodying the concept of the invention. There is provided a three-stage first transistorized power amplifier section comprising a resistively-coupled switching transistor 10 of a preselected polarity. A like-poled second resistively-coupled transistor 11 couples the output of the first transistor stage to the input of power amplifying third stage transistor 12, complimentary to or oppositely-poled as transistors 10 and 11. The output of complimentary transistor 12 is coupled to an inductive load impedance 13 by means of a unipolarly conductive impedance or diode 14, so poled as to allow direct current charging of load 13 by conduction of transistor 12 in response to switching on of switching transistor 10 while blocking the transistor 12 from any self-inductive discharge from load 13 or any trigger output from auxiliary transistor 15, as will be more fully explained hereinafter.

There is further provided in the arrangement of FIG. 1 an auxiliary or compensatory amplifier section comprising a differentiating transistor stage having an input coupling transistor 16, complimentary to or oppositely poled as transistor 10 and having the control electrode thereof input-coupled to the output of transistor 10 by means of a differentiating R-C network comprising series coupling capacitor 17 and shunt resistor 18. Such auxiliary amplifier stage further includes output transistor 15, like-poled as output transistor 12 and resistively input-coupled to the output of transistor 16. An output of transistor 15 is connected in parallel with that of transistor 12 across load impedance 13. It is also to be noted that the bus voltage supplied to the auxiliary section is greater than that supplied to the first transistorized amplifier section. Further, a unipolarly conductive impedance or diode 19 is shunted across input shunt resistor 18 to allow the signal transport of signal transport of signal differentiations of only a preselected sense (and avoiding the doublet-impulse effect).

Figure 2:
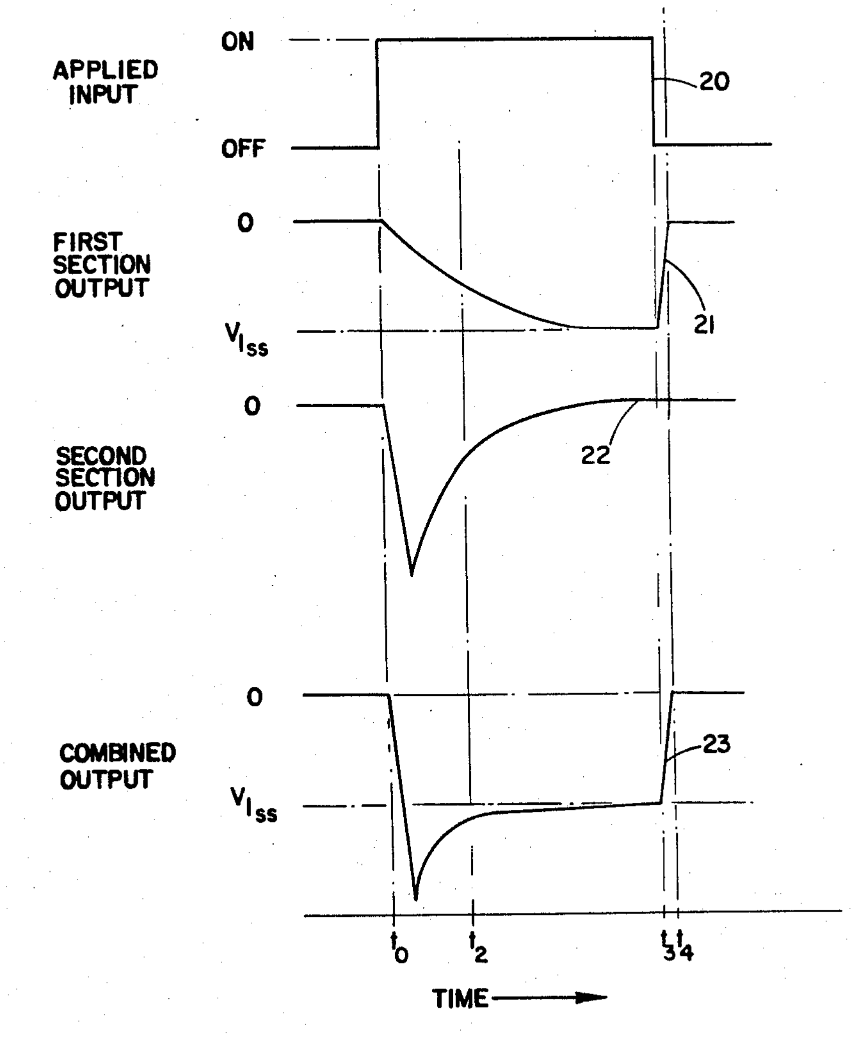
FIG. 2 is a family of time histories of the responses of various portions of the device of FIG. 1.

In normal operation of the above-described arrangement, and in the absence of an applied (positive) input on input terminal 25 (i.e., terminal 25 is grounded as indicated in FIG. 2 by curve 20 prior to $t_o$), transistor 10 is turned on and transistors 11, 12, 15 and 16 are turned off. Upon the application of a command signal (of positive sense) to input terminal 20 (curve 20 at $t_o$), switching transistor 10 is turned off and transistors 11 and 12 are turned on.

The rise time of the magnetizing current through magnetomotive device 13 (in FIG. 1) is determined by the L/R time constant of the circuit comprising elements 12 and 13, as is well understood in the art, which rise-time and response to the applied rectangular wave shape input signal (curve 20 of FIG. 2) are illustrated by curve 21 in FIG. 2. A sharp cut-off is provided the output of transistor 12 (curve 21 between $t_3$and $t_4$) in response to the switching-off of the applied input on terminal 25 (curve 20 at time, $t_3$) by the cooperation of blocking diode 14, which serves to block any back-EMF induced current flow between inductance 13 and transistor 12. In other words, diode 14 provides a large value of R in the effective L/R time constant, as to seriously attenuate the value of such time constant.

Concomitantly with the turning off of switching transistor 10, a pulse is applied to the base of transistor 16, the width of which pulse is determined by the R-C product of elements 18 and 17 and the height of which is limited by the supply voltage $V_2$. The voltage pulse described by curve 22 turns on transistor 16 which, in turn, turns on transistor 15, which delivers a corresponding high current pulse to element 13 (in FIG. 1).

By increasing the supply voltage to transistor 15 over that used with transistor 12 and employing a charging R-C time constant for differentiator elements 17 and 18 which is much smaller than the L/R charging time-constant provided by elements 12 and 13, an impulse response may be obtained for curve 22 (in FIG. 2) which, when combined with the response of curve 21 to obtain the combined response curve 23, compensates for the time-delay turn-on response of curve 21. Blocking diode 14 also serves to prevent shunting of the compensatory pulse output through transistor 12 to the lower potential supply $V_1$. Also, the use of shunting diode 19 prevents oppositely poled differentiator responses to reversals in the points of inflection in the rectangular wave shape input of curve 20.

Thus, there has been described an electromotive drive circuit having both rapid turn-on and rapid turn-off properties. Further, because of the small area under curve 22, little energy is required to drive a given compensatory circuit. Thus, where a large number of electromotive devices are being sequentially actuated such as, for example, the electromagnetically actuated needle jacks of an electronically controlled knitting machine, the average power requirement is little more than the total steady state power required by the number of jacks whose on-cycles overlap, and very little additional power capacity is required to energize the above-described compensatory circuit. In other words, because of the shorter period of the compensatory circuit response, fewer of the sequentially actuated jacks will have mutually overlapping turn-on transients which, coupled with the low energy requirement of each turn-on transient power requirement, imposes only a minimal incremental power requirement upon the power supply for driving the above described magnetization driver circuits for such electromagnetically actuated jacks.

Accordingly, there has been described an improved drive circuit for pulse modulated excitation of a plurality of sequentially-excited inductive load impedances and having both a fast turn-on/turn-off capability and minimum power consumption.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A magnetic driver system having fast turn-on, fast turn-off and minimum power consumption comprising a first switched transistor circuit for providing a sustaining steady state magnetizing current over the duration of a selected interval and comprising a low-voltage saturable switch, a compensatory second switched transistor circuit responsive to a preselected change in switched state of said first circuit for providing a rapid rise-time pulse of short duration, said second circuit comprising a high current short duration pulsing circuit, the outputs of said first and second circuits being connected in parallel and adapted to cooperate with a single common magnetizing circuit, the response of said second circuit compensating for the slower rise time response of said first circuit, said output of said first circuit being connected by a coupling diode.

2. The device of claim 1 in which said first circuit is comprised of a resistively input coupled first phase inverting transistor stage, and a non-phase-inverting saturable switching transistor stage resistively input coupled to an output of said first transistor stage.

3. The device of claim 1 in which said second circuit is comprised of a non-phase inverting current amplifier stage of like-phased output as said first circuit.

4. The device of claim 1 in which said second circuit is comprised of a non-phase-inverting current amplifier having an input capacitively coupled to an output of said first stage of said first circuit and having a preselectively poled blocking diode shunted across said input of said second circuit.

* * * * *

PO-1050
(5/69)

UNITED STATES PATENT OFFICE
CERTIFICATE OF CORRECTION

Patent No. 3,678,298 Dated July 18, 1972

Inventor(s) George A. Dyer

It is certified that error appears in the above-identified patent and that said Letters Patent are hereby corrected as shown below:

In the drawings, sheet 1, Figure 1: The arrowhead on the emitter of transistor 16 should be reversed and positioned with the point of the arrow touching the heavy horizontal line that represents the transistor base. Column 2, line 8 "transistor 10" should read ...transistor 15.... Column 2, line 49 "$V_2$" should read ...$V_1$... .

Signed and sealed this 24th day of April 1973.

(SEAL)
Attest:

EDWARD M. FLETCHER, JR.
Attesting Officer

ROBERT GOTTSCHALK
Commissioner of Patents